United States Patent Office 3,255,156
Patented June 7, 1966

3,255,156
PROCESS FOR POLYMERIZING THIOCARBONYL COMPOUNDS
Arthur L. Barney, Wilmington, Del., assignor to E. I. du Pont de Nemours and Company, Wilmington, Del., a corporation of Delaware
No Drawing. Filed May 1, 1961, Ser. No. 106,540
7 Claims. (Cl. 260—79)

This invention relates to an improved process for the polymerization of thiocarbonyl compounds.

Recently it has been found that a wide variety of thiocarbonyl compounds can be polymerized by the action of suitable initiators. Thus, both homopolymers of thiocarbonyl compounds and their copolymers with different thiocarbonyl compounds and ethylenically unsaturated compounds have been prepared. However, with the polymerization initiators heretofore used, the processes have required high temperatures or pressures, long reaction times, or the use of ultraviolet irradiation, which is expensive and can involve operating difficulties; and even so the polymers are frequently not of high molecular weight.

It is the principal object of this invention to provide an improved process for preparing homopolymers and copolymers of thiocarbonyl compounds, including copolymers with other thiocarbonyl compounds and ethylenically unsaturated compounds, i.e., a process which not only requires less rigorous process conditions than heretofore possible, but which also produces highly useful, higher molecular weight polymers whose properties are superior to those obtainable from the same compound or compounds by any previously known processes. These highly desirable improvements are realized by using a polymerization initiator composed of a trihydrocarbylboron compound and an oxidizing agent in the polymerization process.

Thus, in accordance with the improved process of this invention, polymerization is effected merely by bringing the thiocarbonyl compound alone or in admixture with at least one other thiocarbonyl compound or ethylenically unsaturated compound, into contact with the boron compound and the oxidizing agent at temperatures in the range of −150° C. to 50° C. The higher quality polymers are obtained when a thiocarbonyl monomer and an ethylenically unsaturated monomer are copolymerized.

The process of the present invention constitutes an improvement in known processes for polymerizing thiocarbonyl compounds, e.g., those disclosed in the following patents.

U.S. Patent No. 2,980,695 discloses methods of polymerizing thiocarbonyl fluoride

and thiocarbonyl chlorofluoride

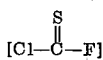

including their copolymerization with ethylenically unsaturated monomers, e.g., tetrafluoroethylene and vinyl fluoride.

French Patent No. 1,247,137 discloses methods of homopolymerizing α-fluorothioacyl fluorides and copolymerizing such fluorides with other copolymerizable monomers, e.g., other α-fluorothioacyl fluorides and ethylenically unsaturated monomers such as propylene. Examples of α-fluorothioacyl fluorides whose polymerization is disclosed therein are: chlorofluorothioacetyl fluoride

difluorothioacetyl fluoride

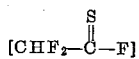

trifluorothioacetyl fluoride

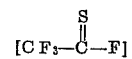

pentafluorothiopropionyl fluoride

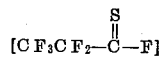

chlorodifluorothioacetyl fluoride

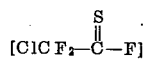

monofluorothioacetyl fluoride

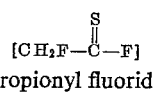

and α,α-difluorothiopropionyl fluoride

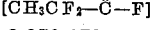

In U.S. Patent No. 2,970,173, methods of homopolymerizing polyfluorothioketones are disclosed. Examples of the thioketones whose polymerization is disclosed therein are: perfluorobutanethione

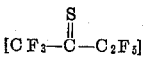

perfluoro-4-heptanethione

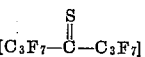

perfluoropropanethione

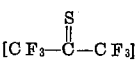

4H-heptafluoro-2-butanethione

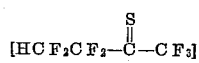

4-chloroheptafluoro-2-butanethione

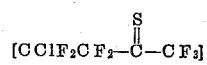

perfluorohexane-2-thione

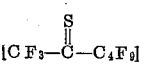

perfluoroheptane-2-thione

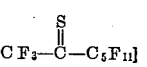

perfluorooctane-2-thione

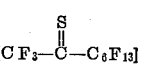

1,1,1,3,3-pentafluorobutane-2-thione

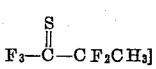

and trifluorothioacetophenone

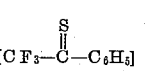

Also, the process of the invention is an improvement in those processes of polymerizing thiocarbonyl compounds disclosed in assignee's copending applications, as follows:

Application S.N. 791,860, filed February 9, 1959, now U.S. Patent 3,069,396, discloses methods of homopolymerizing polyfluorothioketones and copolymerizing such ketones with different polyfluorothioketones and copolymerizable monomers. Examples of the thioketones whose polymerization is disclosed therein are: perfluorobutanethione

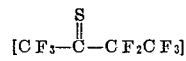

perfluoro-4-heptanethione

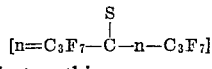

4H-heptafluoro-2-butanethione

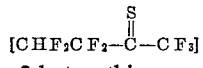

4-chloroheptafluoro-2-butanethione

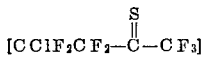

and perfluoropropanethione

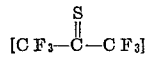

Application S.N. 833,913, filed August 17, 1959, now U.S. Patent 3,113,936, discloses methods of homopolymerizing fluorothioacyl chlorides and copolymerizing such chlorides with other copolymerizable monomers, e.g., different fluorothioacyl chlorides, thioacyl fluorides, fluorinated thioketones and ethylenically unsaturated monomers such as propylene and vinyl acetate. Examples of fluorothioacyl chlorides whose polymerization is disclosed therein are: trifluorothioacetyl chloride

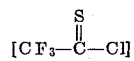

β-chlorotetrafluorothiopropionyl chloride

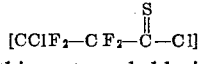

5-chlorooctafluorothiopentanoyl chloride

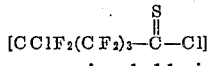

and β-hydrotetrafluoropropionyl chloride

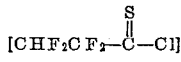

Application S.N. 860,326, filed December 18, 1959, now U.S. Patent 3,069,397, discloses methods of homopolymerizing α-fluorinated thioketones and copolymerizing them with other thiocarbonyl compounds. Examples of polymerizable thioketones disclosed therein are: 1,1,1-trifluorothioacetone

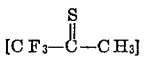

1,1,2,2-tetrafluoro-3-pentanethione

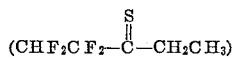

α,α,α-trifluorothioacetophenone

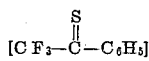

1,1-difluorothioacetone

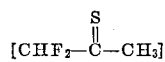

n-loweralkyl perfluoromethyl thioketones

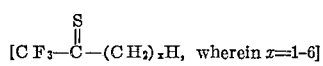

methyl perfluoroethyl thioketone

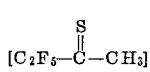

methyl perfluoropropyl thioketone

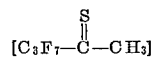

isopropyl perfluoromethyl thioketone

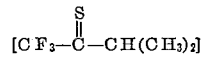

2H-perfluoro-n-butyl methyl thioketone

and cyclohexylmethyl perfluoromethyl thioketone

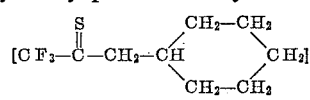

Application S.N. 860,354, filed December 18, 1959, now U.S. Patent 3,026,304, discloses methods of homopolymerizing thiocarbonyl chlorocyanide

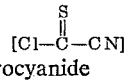

and thiocarbonyl fluorocyanide

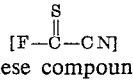

and copolymerizing these compounds with other thiocarbonyl monomers and ethylenically unsaturated monomers.

The improved process of this invention can be used to advantage in polymerizing any thiocarbonyl compound capable of addition polymerization and which will not react with the thiocarbonyl or ethylenically unsaturated comonomer in the absence of the initiator, e.g., any of the above-listed thiocarbonyl compounds are suitable.

Because they are more readily available, the preferred thiocarbonyl compounds for use in the process of this invention are those of the formula:

wherein R is a halogen of atomic number 9–17 (fluorine or chlorine) or

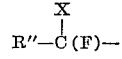

R' is fluorine

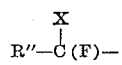

alkyl of up to seven carbon atoms or CN, with the proviso that when R' is CN, R is chlorine or fluorine; R" is hydrogen, fluorine, chlorine, alkyl of 1–6 carbons, or polyhaloalkyl of 1–6 carbons in which all halogens are of atomic number 9–17; and X is halogen of atomic number 9–17.

Most preferred are thiocarbonyl monomers in which R is chlorine, fluorine, or perhalomethyl or hydroperhalomethyl in which the halogens are of atomic number 9–17 and R' fluorine or perfluoromethyl, particularly those in which R or R' is fluorine, because of the superior properties of the polymers obtained.

The range of ethylenically unsaturated compounds that can be used is extremely broad. As hereinafter used, the term, ethylenically unsaturated compound, includes any such compound which is capable of addition polymerization, and is free of acetylenic and allenic unsaturation and groups that react with the thiocarbonyl compound in the absence of the hydrocarbylboron compound and the oxidizing agent. The ethylenic unsaturation can be terminal, as in a vinyl or allyl group, or it can be internal; and there can be more than one such unsaturation per molecule. Suitable ethylenically unsaturated monomers include hydrocarbons (e.g., ethylene, 2-butene, styrene, 1,3-butadiene), halohydrocarbons (e.g., vinyl fluoride, allyl chloride, and 2,3-dichloro-1,3- butadiene), ethers (e.g., 3,3-diethoxypropene), esters (e.g., vinyl acetate, allylidene acetate, 2-chloroethyl acrylate and allyl n-butyrate), nitriles (e.g., acrylonitrile), acid halides (e.g., methacrylyl chloride), and silanes (e.g., vinyltrimethylsilane). Ethylenically unsaturated monomers of up to 8 carbon atoms are preferred because they are readily available.

The hydrocarbylboron compounds that constitute one component of the polymerization initiator used in the process of this invention can be represented by the formulas:

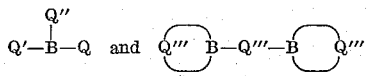

wherein each of Q, Q′ and Q″, which may be the same or different, is alkyl of up to 18 carbons or cycloalkyl (includes unsubstituted cycloalkyl and alkyl substituted cycloalkyl) of from 4 to 8 ring carbons and a total of up to 18 carbons, and Q‴ is divalent alkylene of from 4 to 8 carbons. Suitable hydrocarbylboron compounds include, among others, triisopropylboron,
tri-tert-butylboron,
tri-n-hexylboron,
tri-n-octylboron,
tri-n-dodecylboron,
tri-n-octadecylboron,
tri-(4-ethylcyclohexyl)boron,
tri-(3-methylcyclopentyl)boron,
tricyclohexylboron,
tri-(4-n-hexylcyclohexyl)boron,
tri-(4-n-dodecyclohexyl)boron,
tricyclooctylboron,
methyl-n-dodecyl-n-tetradecylboron,
isobutylcyclopentyl-1-methylheptylboron
and cyclooctyl-1-methylundecyl-n-octadecylboron.

Other useful hydrocarbylboron compounds are found in column 8 and in Examples 1–37. Because of their availability and high effectiveness, the preferred hydrocarbylboron compounds are those in which Q, Q′ and Q″ are the same, particularly the trialkylborons wherein each alkyl group contains up to 12 carbons.

Oxygen or a peroxy compound can be used as the oxidizing agent which is the second component of the polymerization initiator. However, because of their ready availability and ease of use, oxygen (pure or in the form of air) and organic peroxides of the formula Y—O—O—Z, where Y is hydrocarbyl or acyl of up to 12 carbons, and Z is H or Y are preferred. For economic reasons, oxygen is most preferred. Suitable peroxides include diethyl peroxide, tert-butyl hydroperoxide, di-tert-butyl peroxide, didodecanoyl peroxide, diacetyl peroxide, benzoyl peroxide, cumene hydroperoxide and dicumyl peroxide.

In copolymerizations, the weight ratio of one compound to be polymerized to another can be varied widely e.g., from 99:1 to 1:99, depending in part on the properties desired in the product. Preferably the weight ratio is between 95:5 and 5:95. Copolymerization of about 10 parts of a polymerizable, ethylenically unsaturated monomer with about 90 parts of thiocarbonyl fluoride by the process of this invention gives a copolymer which, in contrast to polythiocarbonyl fluoride, does not crystallize at low temperatures; and is more resistant to high-temperature degradation, is more susceptible to aftertreatments, and has better rheological properties than polythiocarbonyl fluoride. Copolymerization of about 15 parts of a suitable thiocarbonyl compound with about 85 parts of ethylene gives a noncrystalline, elastomeric copolymer in contrast to nonelastomeric, crystalline polyethylene. Similar copolymerizations of thiocarbonyl compounds with vinyl acetate or vinyl chloride give products that have distinctly different adhesive properties from those of the vinyl homopolymers.

The amount of hydrocarbylboron compound can be varied considerably and can be between 0.005% and 10% by weight of the total amount of the compound or compounds to be polymerized. Preferably it is between 0.01% and 1% by weight.

The amount of oxidizing agent is governed by the amount of hydrocarbylboron compound. Between 0.1 mole and 2.0 moles of oxidizing agent per mole of hydrocarbylboron compound can be used. The preferred ratio is about 0.5 mole of oxidizing agent per mole of hydrocarbylboron compound. If special measures have not been taken to remove all free oxygen from the compound(s) to be polymerized and from the apparatus, there may be enough oxygen present to act as oxidizing agent, without addition of any material for this purpose.

The order of addition of the reaction components may or may not be critical. In what will arbitrarily be called "normal" addition, the solvent, if one is used, is added to the reaction vessel first, then the comonomer, then the thiocarbonyl compound, then the hydrocarbylboron compound, and finally the oxidizing agent, if any is required in addition to the oxygen that may already be present. In what will arbitrarily be called "reverse" addition, the solvent, if any, is added to the reaction vessel first, then the comonomer, then the hydrocarbylboron compound, then the thiocarbonyl compound, and finally the oxidizing agent, if any is required in addition to the oxygen that may already be present. Generally, "reverse" addition must be used when the comonomer is sufficiently basic that it can act as an anionic initiator (or coinitiator) for polymerization of the thiocarbonyl compound. Such anionically initiated polymerization usually gives a homopolymer of the thiocarbonyl compound. Adding the hydrocarbylboron compound before the thiocarbonyl compound suppresses this anionic polymerization. An example of a comonomer that is basic enough to cause anionic polymerization is allylidene acetate, $$CH_2=CH—CH(OCOCH_3)_2$$

When there is no material present that is sufficiently basic to initiate anionic polymerization, either "normal" or "reverse" addition can be used.

The temperature of the reaction can be varied widely and is usually determined by the polymerization behavior of the compound or compounds to be polymerized. Temperatures between −150° C. and 50° C. can be used. The process is preferably carried out at a temperature between −100° C. and 10° C. A convenient temperature for carrying out many of the polymerizations and copolymerizations of this invention is approximately −80° C., the temperature obtained by cooling with solid carbon dioxide.

The pressure is not critical and may vary from considerably less than atmospheric pressure to as high as several thousand atmospheres. The process is usually carried out in a closed system at the autogenous pressure of the reaction mixture.

A solvent is not required but may be used if desired. Solvents that can be used include aliphatic and cycloaliphatic hydrocarbons (e.g., pentane, methylcyclopentane, heptane, or petroleum ether) and halocarbons (e.g., dichlorodifluoromethane or hexafluoropropene). The amount of solvent may be varied widely but is usually from 0.5 to 5 times the total amount (parts by weight) of the compound or compounds to be polymerized. Since the preferred hydrocarbylboron compounds of this invention are spontaneously inflammable in air, they are conveniently and usually handled as solutions in inert solvents such as heptane.

The time required for the operation of the process of this invention varies considerably. It can be as short as a few minutes because some of the polymer product forms immediately, or as long as 24 hours depending on the yield desired. Usually, the reaction will proceed to practical completion in from one to eight hours, and thus, a time within this range is preferred.

The course of the polymerization reaction can be followed, and the point of completion determined, in several ways. For example, many thiocarbonyl monomers have characteristic colors, and their polymerization or copolymerization can be followed by the gradual disappearance or change of this color. In some cases the polymeric products separate as solids from the liquid mixtures. In still other cases the mixture remains liquid but increases markedly in viscosity as the polymerization proceeds.

The polymeric product is conveniently isolated by adding to the mixture an excess of a nonsolvent for the polymer, separating by filtration or centrifugation the solid polymeric product that precipitates or is already present, washing the solid by suitable means, and drying. The separation and washing steps remove catalyst residues. Typical nonsolvents are alcohols such as methyl alcohol or ethyl alcohol and hydrocarbons such as hexane or petroleum ether.

The apparatus used for the polymerization is preferably a vessel into which the components of the reaction can be introduced without introduction of contaminants such as, for example, moisture or excess air. Reactors with inner surfaces of glass, ceramic material, or metal can be used. Optionally, means of agitating the reaction mixture can be incorporated in the apparatus.

The thiocarbonyl compounds used in the process of this invention can be prepared as follows:

Thiocarbonyl fluoride and thiocarbonyl chlorofluoride are prepared by the pyrolysis of tetrafluoro-1,3-dithietane and chlorotrifluoro-1,3-dithietane, respectively, as described in U.S. Patent No. 2,980,695.

α-Fluorothioacyl fluorides, e.g. chlorofluorothioacetyl fluoride, are prepared by removal of the elements of hydrogen fluoride from α-fluoroalkanethiols, as described in French Patent No. 1,247,137.

Fluorinated thioacyl chlorides, e.g., trifluorothioacetyl chloride, are prepared by the reaction of suitable chlorofluoroalkanes with sulfur, as described in assignee's copending application S.N. 833,913, filed August 17, 1959, now U.S. Patent 3,113,936.

Fluorothioketones containing at least two fluorine atoms on each carbon attached directly to thiocarbonyl carbon, e.g., perfluorothioacetone, are prepared by the reaction of a di(fluoroalkyl)mercury with phosphorus pentasulfide, as described in U.S. Patent No. 2,970,173; and α-fluorothioketones (ketones containing fluorine atoms on only one carbon attached directly to thiocarbonyl carbon) are prepared by the thermal decomposition of fluorine-containing gem-dithiols or gem-olthiols, e.g., 1,1,1-trifluoro-2-mercapto-2-propanol to yield methyl perfluoromethyl thioketone, as described in assignee's copending application S.N. 860,326, filed December 18, 1959, now U.S. Patent 3,069,397.

Thiocarbonyl chlorocyanide and thiocarbonyl fluorocyanide are prepared by reacting sulfur with, e.g., trichloroacetonitrile and chlorofluoroacetonitrile, respectively, at a temperature of about 600° C., as described in assignee's copending application S.N. 860,354, filed December 18, 1959, now U.S. Patent 3,026,304.

The hydrocarbylboron compound (A), 1,6-bis-(1-boracycloheptyl)hexane is prepared by allowing 1,5-hexadiene to react with diborane by the method of K. A. Saegebarth, J. Am. Chem. Soc., 82, 2081 (1960). Compound (B), 1,4-bis(1-bora-3,4-dimethylcyclopentyl)2,3-dimethylbutane, is prepared by the same method from 2,3-dimethylbutadiene and diborane.

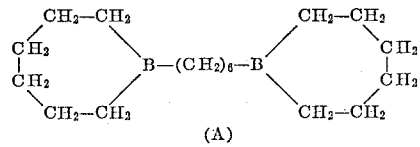

(A)

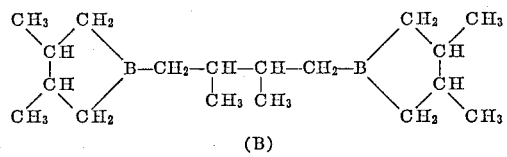

(B)

Other suitable compounds similar to (A) and (B), e.g., 1,4-bis(1-boracyclopentyl)butane; 1,4-bis(1-bora-3-methylcyclopentyl)-2-methylbutane; 1,4-bis(1-bora-2-methylcyclopentyl)-1-methylbutane; 1,5-bis(1-bora-2-methylcyclohexyl)-1-methylpentane; 1,6-bis(1-bora-3,6-dimethylcycloheptyl)-2,5-dimethylhexane; 1,5-bis(1-bora-2-n-propylcyclohexyl)-1-n-propylpentane; and 1,4-bis(1-bora-2-methyl-5-n-propylcyclopentyl)-1-methyl-4-n-propylbutane can be made by the same method from diborane and the corresponding diene.

The hydrocarbylboron compounds which contain only one boron atom are either commercially available or are readily produced by conventional prior art techniques.

The following examples, in which parts are by weight, illustrate the process of this invention.

EXAMPLE 1

A glass reactor equipped with an inlet for introducing reactants was purged with nitrogen and cooled to 0° C. Into the reactor there were introduced, in turn, 0.8 part of thiocarbonyl chlorofluoride, 0.015 part of tri-n-butylboron, and 0.0023 part of air. The reactor was sealed and the mixture maintained at 0° C. for two hours under the autogenous pressure of the reactants. During the first 30 minutes, the originally mobile liquid increased markedly in viscosity, and the bright yellow color of the thiocarbonyl chlorofluoride gradually decreased in intensity. After two hours, the liquid would no longer flow under the influence of gravity. Excess methyl alcohol was added to the mixture to precipitate the product. The precipitated polythiocarbonyl chlorofluoride was washed with methyl alcohol and dried. The dried polymer, 0.2 part, was a tough, rubbery solid. A film pressed from the product at 75° C. was elastomeric at 0° C. and showed no tendency to crystallize at −80° C.

EXAMPLE 2

A vessel similar to that used in Example 1 was purged with nitrogen and cooled to −80° C. There were introduced, in turn, 9.6 parts of thiocarbonyl fluoride, 2.4 parts of chlorofluorothioacetyl fluoride, and 0.045 part of tri-n-butylboron as a 10% solution in heptane. The free oxygen present in the materials acted as the oxidizing agent. The mixture was maintained at −80° C. for three hours under autogenous pressure. Precipitation with methyl alcohol, washing, and drying as in Example 1 gave 4.0 parts of nontacky solid containing 2.47% chlorine. This chlorine content corresponds to a thiocarbonyl fluoride/chlorofluorothioacetyl fluoride copolymer containing 9% by weight of combined chlorofluorothioacetyl fluoride. A film pressed from the copolymer at 100° C. was easily extensible and pliable over a wide temperature range.

EXAMPLE 3

A vessel similar to that used in Example 1 was purged with nitrogen and cooled to −80° C. There were introduced, in turn, 1.1 parts of styrene, 1.6 parts of thiocarbonyl chlorofluoride, and 0.09 part of tri-n-butylboron. The free oxygen present in the materials acted as the oxidizing agent. The mixture was maintained at −80° C. for 16 hours under autogenous pressure. Precipitation with methyl alcohol, washing, and drying as in Example 1 gave 1.1 parts of solid containing 27.48% sulfur and 31.34% chlorine. This corresponds to a copolymer containing about 86% by weight combined thiocarbonyl chlorofluoride and 14% styrene. A rubbery film was pressed from the copolymer at 100° C.

EXAMPLE 4

A vessel similar to that used in Example 1 was purged with nitrogen and cooled to —80° C. There were introduced, in turn, 2.2 parts of allylidene acetate, 0.6 part of triethylboron as an 18.2% solution in heptane, 17.5 parts of thiocarbonyl fluoride, and 0.0086 part of oxygen. The mixture was maintained at —80° C. for 16 hours under autogenous pressure. Precipitation with methyl alcohol, washing, and drying as in Example 1 gave 14.5 parts of a rubbery solid, which was shown to be a thiocarbonyl fluoride/allylidene acetate copolymer containing 10.8% by weight of combined allylidene acetate. An elastomeric film was pressed from the copolymer at 100° C.

EXAMPLES 5–37

The procedures described in Examples 1–4 were used to prepare other homopolymers and copolymers of thiocarbonyl compounds. These polymerizations are summarized in the following table. Unless otherwise noted, no solvent was used (except for the hydrocarbylboron compound), "normal" addition was used, no oxidizing agent in addition to the oxygen already present was added, the reaction temperature was —80° C., and the precipitating and washing liquid was methyl alcohol.

POLYMERIZATIONS AND COPOLYMERIZATIONS OF THIOCARBONYL COMPOUNDS

| Ex. | Parts Thiocarbonyl Compound | Parts Comonomer | Parts Hydrocarbyl boron Compound [1] | Parts Oxidizing Agent (in Addition to $O_2$ Present) | Time, Hrs. | Parts Product | Weight Percent Thiocarbonyl Compound in Copolymer | Properties of Film |
|---|---|---|---|---|---|---|---|---|
| 5 | 8.0 $CF_2=S$ | None | 0.09 $Bu_3B$ | 0.02 Tert.-BuOOH | 1 | 5.8 | | Elastomeric. |
| 6 | 8.0 $CF_2=S$ | do | 0.14 cp'd. A [2] | 0.009 $O_2$ | 0.05 | 5.7 | | Do. |
| 7 | 8.0 $CF_2=S$ | do | 0.14 cp'd. B [3] | None | 0.02 | 5.8 | | Do. |
| 8 | 3.2 $CClF=S$ (3.5 parts ethyl ether solvent) | do | 0.04 $Bu_3B$ | do | 2 | 2.0 | | Do. |
| 9 | 1.6 $CHClFCF=S$ | do | 0.015 $Bu_3B$ | do | 1 | 1.0 | | Stiff, strong. |
| 10 | 1.9 $ClCF_2CF=S$ | do | 0.015 $Bu_3B$ | do | 16 | 2.3 | | Tough. |
| 11 | 1.6 $(CF_3)_2C=S$ | do | 0.24 $Bu_3B$ | do | 2 (—110° C.) | 0.2 | | Elastomeric. |
| 12 | 1.6 $CF_2=S$ | 0.4 ethylene | 0.008 $Et_3B$ | .007 $O_2$ | 18 | | 80 | Elastomeric, soluble in chloroform. |
| 13 | 8.0 $CF_2=S$ (20 parts heptane solvent) | 9.4 propylene | 0.008 $Bu_3B$ | .0035 $O_2$ | 2 | 3.9 | 79 | Tough, elastomeric. |
| 14 | 1.6 $CF_2=S$ (2.9 parts petroleum ether solvent) | 1.3 isobutylene | .015 $Et_3B$ | .0028 $O_2$ | 18 | 1.4 | 69 | Do. |
| 15 | 1.8 $CF_2=S$ | 1.3 1-hexene | .012 $Et_3B$ | .0042 $O_2$ | 2 | | 71 | Tough, elastomeric, slightly tacky. |
| 16 | 3.4 $CF_2=S$ | 2.0 vinylcyclohexane | .038 $Bu_3B$ | .007 $O_2$ | 18 | 4.4 | 62 | Tacky. |
| 17 | 4.8 $CF_2=S$ | 6.4 vinyl chloride | .028 $Bu_3B$ | None | 18 | 1.7 | 71 | Do. |
| 18 | 2.4 $CF_2=S$ | 4.9 vinyl fluoride | .021 $Et_3B$ | .0042 $O_2$ | 18 | 2.9 | 89 | Tough, opaque. |
| 19 | 1.4 $CF_2=S$ | 2.2 allyl chloride | .025 $Et_3B$ | .0042 $O_2$ | 18 | 1.7 | 66 | Tough, opaque (slightly cross-linked). |
| 20 | 1.6 $CClF=S$ | 1.1 2,3-dichloro-1,3-butadiene | 0.03 $Et_3B$ | None | 24 (0° C.) | 2.0 | 70 | Tough, elastomeric. |
| 21 | 1.6 $CF_2=S$ ("reverse" addition) | 0.4 3,3-diethoxypropene | .013 $Et_3B$ | .0042 $O_2$ | 2 | | 60 | Elastomeric. |
| 22 | 4.0 $CClF=S$ | 0.9 vinyl acetate | 0.015 $Bu_3B$ | None | 16 | 4.0 | 97 | Tough. |
| 23 | 32 $CF_2=S$ | 4.7 vinyl acetate | 0.03 $Bu_3B$ | do | 18 | 16 | 87 | Easily extensible. |
| 24 | 3.2 $CF_2=S$ ("reverse" addition) | 2.7 isopropenyl acetate | .038 $Et_3B$ | .007 $O_2$ | 18 | 3.9 | 68 | Elastomeric, tough. |
| 25 | 3.0 $CF_2=S$ ("reverse" addition) | 3.2 allyl chloroformate | .038 $Et_3B$ | .007 $O_2$ | 18 | 2.2 | 66 | Tough, elastomeric. |
| 26 | 1.6 $CClF=S$ | 0.9 ethyl acrylate | 0.09 $Bu_3B$ | None | 16 | 0.5 | 87 | Tough, easily extensible. |
| 27 | 4.8 $CF_2=S$ | 0.9 ethyl acrylate | 0.04 $Bu_3B$ | 0.0014 $O_2$ | 2 | 2.8 | 77 | Pliable, soluble in chloroform. |
| 28 | 24 $CF_2=S$ | 3.0 2-chlorethyl acrylate | 0.08 $Et_3B$ | None | 18 | 17 | 89 | Easily extensible, adhered to aluminum, tacky. |
| 29 | 1.6 $CClF=S$ | 0.8 acrylonitrile | 0.08 $Bu_3B$ | do | 2 | 1.5 | 99.3 | Elastomeric. |
| 30 | 3.7 $CF_2=S$ ("reverse" addition) | 1.8 vinyltrimethylsilane | .038 $Et_3B$ | .007 $O_2$ | 4 | 1.4 | 70 | Do. |
| 31 | 4.0 $CF_2=S$ | 1.7 5-methylenebicyclo[2.2.1]-2-heptene | 0.05 $Et_3B$ | None | 18 | 3.0 | 51 | Do. |
| 32 | 3.2 $CF_2=S$ ("reverse" addition) | 0.8 1-butene | 0.03 $Et_3B$ | 0.006 $O_2$ | 72 | | 77 | Do. |
| 33 | 1.6 $CF_2=S$ | 3.0 2-butene | 0.01 $Et_3B$ | 0.003 $O_2$ | 16 | 1.2 | 73 | Elastomeric, easily extensible. |
| 34 | 1.6 $CF_2=S$ ("reverse" addition) | 2.8 tetramethylethylene | 0.01 $Et_3B$ | 0.003 $O_2$ | 16 | | 66 | Elastomeric. |
| 35 | 3.2 $CF_2=S$ | 4.1 allyl 1,1,2,2-tetrafluoroethyl ether | 0.03 $Bu_3B$ | 0.007 $O_2$ | 2 | 2.7 | 64 | Elastomeric, tough. |
| 36 | 2.1 $CF_2=S$ | 2.6 allyl n-butyrate | 0.02 $Bu_3B$ | 0.004 $O_2$ | 18 | 2.8 | 63 | Elastomeric. |
| 37 | 1.3 $CF_2=S$ | 1.6 α-acetoxyacrylonitrile | 0.02 $Et_3B$ | 0.008 $O_2$ | 0.5 | | 95 | Do. |

[1] "Bu" is n-butyl and "Et" is ethyl.

[2] Compound A:

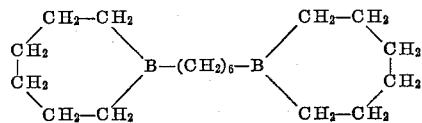

[3] Compound B:

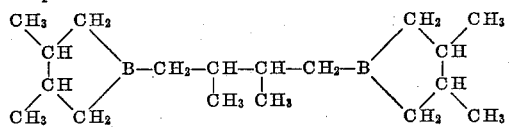

The process of this invention gives useful homopolymers and copolymers of thiocarbonyl compounds, and especially copolymers of thiocarbonyl compounds with ethylenically unsaturated compounds, many of which polymers and copolymers are not readily obtainable, at least not in comparable quality, by any other known method.

Thus, in Example 12, copolymerization of 1.6 parts of thiocarbonyl fluoride with 0.4 part of ethylene in the presence of triethylboron/oxygen at −80° C. by the process of this invention gave a thiocarbonyl fluoride/ethylene copolymer that was soluble in chloroform and could be readily pressed to an elastomeric film at 100° C. When these comonomers in approximately the same ratio were heated with benzoyl peroxide in hexane at 80° C. and a pressure of 1000 lbs./sq. in., i.e., by a known polymerization process, a product was obtained that was insoluble in chloroform and could not be pressed to a film at 100° C.

Again, in Example 13, copolymerization of 8.0 parts of thiocarbonyl fluoride with 9.4 parts of propylene in the presence of tri-n-butylboron/oxygen in heptane at −80° C. gave a thiocarbonyl fluoride/propylene copolymer that could be pressed at 100° C. to a tough, elastomeric film. When these monomers in approximately the same ratio were heated with benzoyl peroxide at 80° C. and a pressure of 1000 lbs./sq. in., a tacky product that was obviously of lower molecular weight than the product of Example 13 was obtained.

Many of the copolymers of thiocarbonyl compounds prepared by the process of this invention have elastomeric properties. The copolymers can be cured or vulcanized to give high-quality elastomers, as illustrated by the following examples:

*Example A*

A mixture of 100 parts of a copolymer of thiocarbonyl fluoride and vinyl acetate (containing 93 weight percent combined thiocarbonyl fluoride), 10 parts of hexahydrotrisacryloyltriazine, 1 part of α,α'-azodiisobutyronitrile, and 65 parts of chloroform was allowed to stand at room temperature for 20 hours. A uniform gel was obtained. The chloroform was removed by pressing the gel into a sheet at 50° C. The polymer composition was then cured by heating this sheet at 100° C. under 2000 lb./sq. in. pressure for one hour. The cured copolymer swelled but did not dissolve in chloroform and had greatly improved elastic characteristics as compared with the uncured product.

*Example B*

One hundred parts of a copolymer of thiocarbonyl fluoride and allyl chloroformate (containing 95% by weight of combined thiocarbonyl fluoride) was mixed with 3 parts of sym.-diisopropyl urea on a press at 50° C. The resulting sheet was cured at 100° C. under 1000 lb./sq. in. pressure for one hour. The cured copolymer was no longer soluble in chloroform and had improved tensile properties at elevated temperatures compared with the uncured product.

*Example C*

An intimate mixture of 100 parts of a copolymer of thiocarbonyl fluoride and t-butyl acrylate (containing 75% by weight of combined thiocarbonyl fluoride) with 2 parts of a commercial 1,1,2,2-tetra(glycidylphenyl)ethane resin was prepared by working on a press at 75° C. The resulting sheet was then cured for two hours at 135° C. under 1000 lb./sq. in. pressure. The cured copolymer was no longer soluble in chloroform and had improved elastic characteristics compared with the uncured product.

*Example D*

A mixture of 100 parts of a copolymer of thiocarbonyl fluoride and ethyl acrylate (containing 88% by weight of thiocarbonyl fluoride), 25 parts of commercial divinylbenzene, 1 part of α,α'-azodiisobutyronitrile, and 750 parts of chloroform was allowed to stand at room temperature for 20 hours. A uniform gel was obtained and the chloroform was removed from the gel by pressing the gel into a sheet at 50° C. The polymer composition was cured by heating this sheet at 100° C. under 5000 lb./sq. in. pressure for one hour. The cured copolymer did not dissolve in chloroform and had greatly improved elastomer characteristics compared with the uncured copolymer.

Other copolymers of thiocarbonyl compounds prepared by the process of this invention are tacky and therefore can be used as adhesives. For example, a copolymer of thiocarbonyl fluoride and 2-chloroethyl acrylate was pressed between sheets of aluminum foil at 100° C. and 5000 lb./sq. in. The resulting film adhered strongly to the aluminum foil.

Still other copolymers of thiocarbonyl compounds prepared by the process of this invention have properties that recommend them for making wrapping films. By proper choice of monomers and proportions thereof, any degree of limpness or stiffness desired can be obtained.

Other copolymers of thiocarbonyl compounds prepared by the process of this invention have good toughness and other properties desired in plastics. For example, copolymers of chlorothiocarbonyl fluoride and 2,3-dichloro-1,3-butadiene containing more than about 60% combined diene can be made into clear, tough plastic articles by compression or injection molding.

Many of the homopolymers of thiocarbonyl compounds and the copolymers of two different thiocarbonyl compounds prepared by the process of this invention also have elastomeric properties. An example of such a homopolymer is polythiocarbonyl fluoride. A homogeneous mixture of this polymer with o-divinylbenzene and benzoyl peroxide can be made by milling at room temperature, and the mixture can be cured by heating at 100° C. under the contact pressure of a hydraulic press. The cured product has high resistance to chemicals such as hydrochloric acid, nitric acid, and sodium hydroxide, to oils, and to abrasion and tearing. An example of an elastomeric copolymer is a copolymer of thiocarbonyl fluoride and chlorofluorothioacetyl fluoride containing 96% by weight of combined thiocarbonyl fluoride. A homogeneous mixture of this copolymer with o-divinylbenzene and azoisobutyronitrile can be made by milling at room temperature or by mixing with a mutual solvent such as chloroform and removing the solvent, either by vacuum evaporation at ordinary temperature or by pressing at about 50° C. The mixture can be cured by pressing at 100° C. and 1000 lbs./in.² Film strips of the cured product thus prepared have very good stress decay, tensile recovery, and modulus ratio.

Since obvious modifications and equivalents in the invention will be evident to those skilled in the chemical arts, I propose to be bound solely by the appended claims.

The embodiments of the invention in which an exclusive property or privilege is claimed are defined as follows:

1. In a process of producing a film-forming polymer by polymerizing a thiocarbonyl compound of the formula

wherein R is selected from the group consisting of chlorine, fluorine and perhalomethyl and hydroperhalomethyl, all halogen being of atomic number 9–17, and R' is selected from the group consisting of fluorine and perfluoromethyl, with an ethylenically unsaturated compound of the group consisting of ethylene and propylene, the improvement which comprises effecting the polymerization at a temperature of −150° C. to 50° C. in the presence of a polymerization initiator consisting of an oxidizing agent selected from the group consisting of oxygen and a peroxy compound, and between 0.005% and 10%, by weight of total polymerizable compound, of a hydrocarbylboron compound of a formula selected from the group consisting of:

wherein Q, Q' and Q'' are selected from the class consisting of alkyl of up to 18 carbons and cycloalkyl of 4 to 8 ring carbons and a total of up to 18 carbons, and Q''' is divalent alkylene of 4 to 8 carbons, said oxidizing agent being present in an amount between 0.1 mole and 2 moles per mole of said hydrocarbylboron compound.

2. The process of claim 1 wherein the temperature is between $-100°$ C. and $10°$ C.

3. The process of claim 1 wherein the hydrocarbylboron compound is present in an amount between 0.01% and 1%, by weight of total polymerizable compound.

4. The process of claim 1 wherein the oxidizing agent is present in an amount of 0.5 mole per mole of hydrocarbylboron compound.

5. The process of claim 1 wherein the oxidizing agent is oxygen.

6. The process of claim 1 wherein the thiocarbonyl compound is thiocarbonyl fluoride and the ethylenically unsaturated compound is ethylene.

7. The process of claim 1 wherein the thiocarbonyl compound is thiocarbonyl fluoride and the ethylenically unsaturated compound is propylene.

References Cited by the Examiner
UNITED STATES PATENTS

| | | | |
|---|---|---|---|
| 2,980,695 | 4/1961 | Middleton | 260—79.7 |
| 2,985,633 | 5/1961 | Welch | 260—85.3 |
| 3,026,304 | 3/1962 | Proskow | 260—79 |
| 3,032,537 | 5/1962 | Walter | 260—79 |
| 3,069,396 | 12/1962 | Middleton | 260—79 |
| 3,069,397 | 12/1962 | Kealy | 260—79 |
| 3,078,309 | 2/1963 | Brown | 260—606.5 |

FOREIGN PATENTS 1,206,042  8/1959  France.

OTHER REFERENCES

Linear and Stereoregular Addition Polymers, by Gaylord et al., Interscience Publication, Inc., 1959, pp. 461–462 relied on.

Steinberg, Organoboron Chemistry, Vol. 1, 1964, John Wiley & Sons, Inc., pp. 113 and 783 relied upon (Lib. of Congress Cat. card No. 63–20,337).

LEON J. BERCOVITZ, *Primary Examiner.*

MORRIS LIEBMAN, *Examiner.*

E. J. SMITH, M. P. HENDRICKSON,
*Assistant Examiners.*